United States Patent
Chiu et al.

(10) Patent No.: US 10,083,082 B2
(45) Date of Patent: *Sep. 25, 2018

(54) EFFICIENT INDEX CHECKPOINTING IN LOG-STRUCTURED OBJECT STORES

(71) Applicant: International Business Machines Corporation, Armonk, NY (US)

(72) Inventors: Lawrence Y. Chiu, Saratoga, CA (US); Paul H. Muench, San Jose, CA (US); Sangeetha Seshadri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/846,888

(22) Filed: Sep. 7, 2015

(65) Prior Publication Data

US 2017/0068599 A1    Mar. 9, 2017

(51) Int. Cl.
  *G06F 11/14* (2006.01)
  *G06F 11/07* (2006.01)

(52) U.S. Cl.
  CPC ...... *G06F 11/1407* (2013.01); *G06F 11/0709* (2013.01); *G06F 11/1435* (2013.01);
  (Continued)

(58) Field of Classification Search
  CPC ............. G06F 11/0709; G06F 11/0751; G06F 11/0787; G06F 11/079; G06F 11/0793; G06F 21/6218; G06F 21/80; G06F 21/805
  See application file for complete search history.

(56) References Cited

U.S. PATENT DOCUMENTS

| 7,257,690 B1 | 8/2007 | Baird |
| 8,364,648 B1 | 1/2013 | Sim-Tang |

(Continued)

OTHER PUBLICATIONS

Sheng, Y. et al.; "TH-CDP: an efficient block level continuous data protection system"; 2009 IEEE International Conference on Networking, Architecture, and Storage (NAS), pp. 395-404, IEEE; Jul. 2009.

(Continued)

*Primary Examiner* — Jigar Patel
(74) *Attorney, Agent, or Firm* — Nelson and Nelson; Daniel P. Nelson; Alexis V. Nelson (57) ABSTRACT

A method to efficiently checkpoint and reconstruct an in-memory index associated with a log-structured object store includes enabling asynchronous write operations to occur to a log-structured object store. The log-structured object store utilizes an in-memory index to access objects therein. The method further enables checkpoint operations to occur to the log-structured object store without pausing the asynchronous write operations. When initiating checkpoint operations, the method establishes a "begin checkpoint" marker on the log-structured object store. This "begin checkpoint" marker is configured to point to an oldest known log location recorded in the in-memory index. In the event the in-memory index is lost, the method reconstructs the in-memory index by analyzing the log-structured object store starting from the oldest known log location. A corresponding system and computer program product are also disclosed and claimed herein.

20 Claims, 12 Drawing Sheets

(52) U.S. Cl.
CPC ...... *G06F 11/1464* (2013.01); *G06F 11/1471* (2013.01); *G06F 2201/80* (2013.01); *G06F 2201/84* (2013.01)

(56) References Cited

U.S. PATENT DOCUMENTS

| | | | |
|---|---|---|---|
| 2004/0193658 A1* | 9/2004 | Kawamura | G06F 11/2074 |
| 2007/0185924 A1* | 8/2007 | Kawamura | G06F 11/2071 |
| 2011/0258198 A1* | 10/2011 | Sun | G06F 17/30702 707/742 |
| 2013/0097369 A1 | 4/2013 | Talagala et al. | |
| 2013/0297855 A1* | 11/2013 | Gupta | G06F 3/0656 711/103 |
| 2014/0279930 A1 | 9/2014 | Gupta et al. | |
| 2015/0261610 A1* | 9/2015 | Gupta | G06F 11/10 714/807 |
| 2015/0286695 A1* | 10/2015 | Kadayam | G06F 11/1448 707/639 |

OTHER PUBLICATIONS

Anonymous; "A Method and System for Allowing Compression above Cache Platforms to Maintain a Fully Persistent Index on Disk"; An IP.com Prior Art Database Technical Disclosure; http://ip.com/IPCOM/000241060; Mar. 23, 2015.

Sears, R.; "Method and System for Providing Insert-Scan Based Computation atop a Plurality of Log-Structured Merge-Trees"; An IP.com Prior Art Database Technical Disclosure; http://ip.com/IPCOM/000213607; Dec. 22, 2011.

* cited by examiner

EFFICIENT INDEX CHECKPOINTING IN LOG-STRUCTURED OBJECT STORES

BACKGROUND

Field of the Invention

This invention relates to systems and methods for recovering from failures or shutdowns in log-structured object storage systems.

Background of the Invention

Storage systems that store objects (files, records, etc.) may be designed to either update the objects in place, or append objects to a log. Conventional object storage systems typically lay out objects for spatial locality and make in-place changes to the object data structures (e.g., by overwriting an object with an updated version of the object) in order to perform well on optical and magnetic disks, which tend to seek relatively slowly. Log-structured object stores, by contrast, may treat storage as a circular log wherein objects, as well as updates to the objects, are written sequentially to the tail of the log. In such systems, updates to an object are appended to the end of the log instead of being used to overwrite the object. An in-memory index may, in certain implementations, be used to locate the most recent version of objects in a log-structured object store. When an updated version of an object is appended to the log, the index may be updated to point to the updated version.

In log-structured object stores that use fully or partially in-memory indexes, the index may be periodically checkpointed to speed up recovery times in the event the index is lost due to a failure or shutdown. These checkpoints may be used to save or persist the in-memory index at the time of the checkpoint. However, high-performance log-structured object stores may support asynchronous write operations to improve utilization and performance. These asynchronous write operations may unfortunately cause stale checkpoints if the asynchronous write operations are not paused when the index is being checkpointed since the index may not reflect asynchronous operations that are in-flight and whose completion is not yet recorded in the index. A stale checkpoint may cause inconsistencies when recovering an in-memory index after a failure or shutdown. Although a log-structured object store may be read and analyzed from its beginning to reconstruct an in-memory index, this process can be overly time consuming and reduce performance.

In view of the foregoing, what are needed are systems and methods to more efficiently reconstruct in-memory indexes after a failure or shutdown. Ideally, such systems and methods will reduce time needed to restore operation of a log-structured object store after the failure or shutdown.

SUMMARY

The invention has been developed in response to the present state of the art and, in particular, in response to the problems and needs in the art that have not yet been fully solved by currently available systems and methods. Accordingly, the invention has been developed to provide systems and methods to more efficiently reconstruct an in-memory index associated with a log-structured object store. The features and advantages of the invention will become more fully apparent from the following description and appended claims, or may be learned by practice of the invention as set forth hereinafter.

Consistent with the foregoing, a method to efficiently checkpoint and reconstruct an in-memory index associated with a log-structured object store is disclosed. In one embodiment, such a method includes enabling asynchronous write operations to occur to a log-structured object store. The log-structured object store utilizes an in-memory index to access objects therein. The method further enables checkpoint operations to occur to the log-structured object store without pausing the asynchronous write operations. When initiating checkpoint operations, the method establishes a "begin checkpoint" marker on the log-structured object store. This "begin checkpoint" marker is configured to point to an oldest known log location recorded in the in-memory index. In the event the in-memory index is lost, the method reconstructs the in-memory index by analyzing the log-structured object store starting from the oldest known log location.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Figure 1:
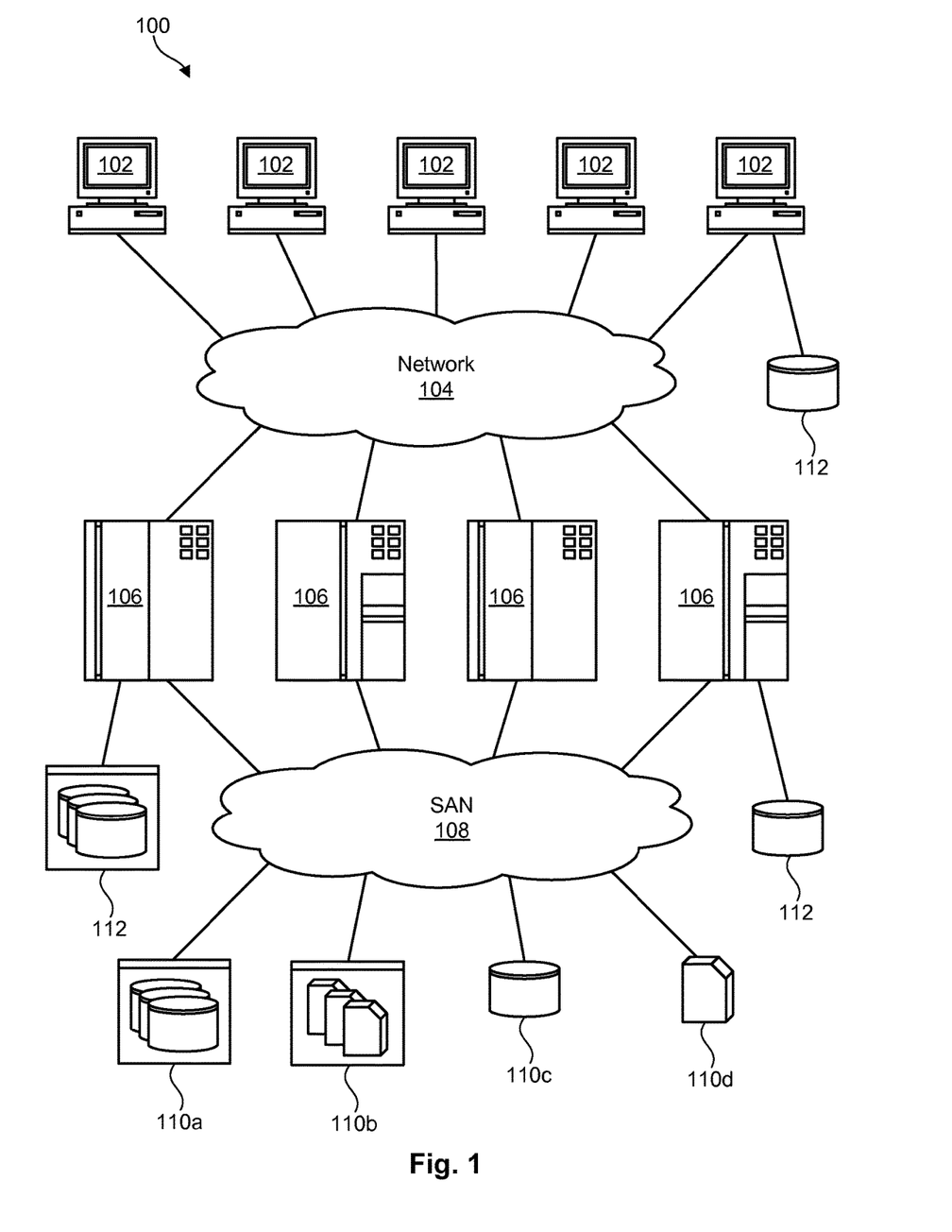
FIG. 1 is a high-level block diagram showing one example of an environment where a system and method in accordance with the invention may be implemented.

Referring to FIG. 1, one example of a network environment 100 is illustrated. The network environment 100 is presented to show one example of an environment where embodiments of the invention may operate. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI. In certain embodiments, a host system 106 or other server may function as an antivirus server 106 for scanning data on storage systems 110, 112 connected to the networks 104, 108.

Figure 2:
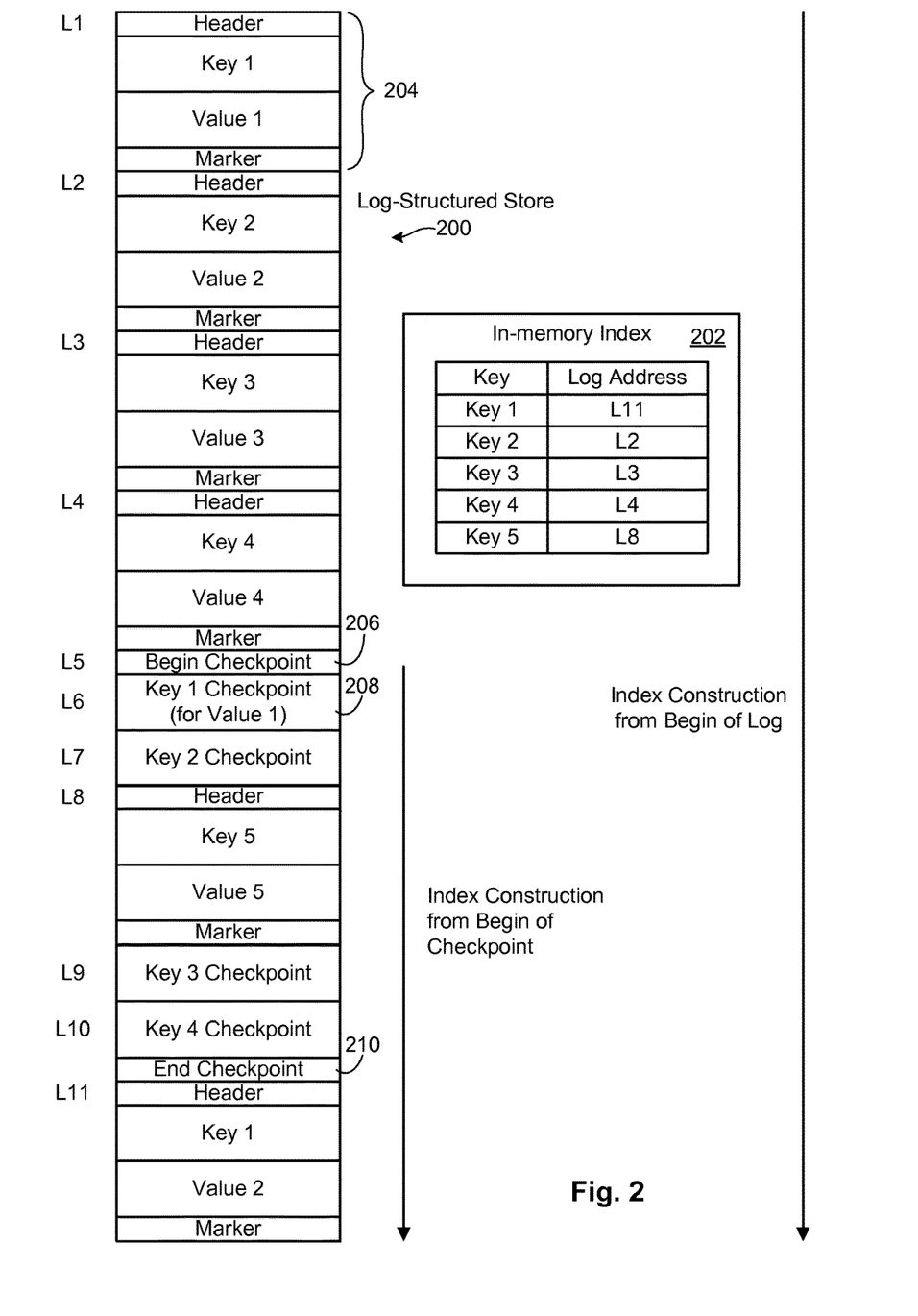
FIG. 2 is a high-level block diagram showing a log-structured object store using an in-memory index.

Referring to FIG. 2, in certain embodiments, any of the storage systems 110 described in FIG. 1 may be configured to function as a log-structured object store. As previously mentioned, log-structured object stores may treat storage as a circular log wherein objects, as well as updates to the objects, are written sequentially to the head of the log. In such systems, updates to an object are appended to the log instead of being used to overwrite the object. This contrasts with conventional object storage systems which typically lay out objects for spatial locality and make in-place changes to the object data structures (e.g., by overwriting an object with an updated version of the object).

Using a log-structured object store in place of a conventional object storage may provide various benefits. For example, write throughput on optical and magnetic disks may be improved because the writes may be batched into large sequential runs that may minimize seeks. Writes to a log-structured object store may also create multiple, chronologically-advancing versions of object data and metadata. Recovery from crashes or failures may also be simpler. When recovering, the log-structured object store may not need to walk all of its data structures to fix inconsistencies, but rather may reconstruct its state from the last consistent point in the log.

FIG. 2 shows one embodiment of a log-structured object store 200 using an in-memory index 202. In this example, the log-structured object store 200 is assumed to use a single-threaded design such that the same thread that is responsible for executing writes to the log-structured object store 200 also executes checkpoints. It is further assumed that writes to the log-structured object store 200 are asynchronous, both for objects and checkpoints stored therein. Further assume that the in-memory index 202 is only updated with a new log location of a key after data associated with the key is resident on the underlying storage media (e.g., disk, tape, SSD, etc.) and the completion of the write is reported to an object indexing service. If a write operation fails, the operation is considered to be aborted.

As shown in FIG. 2, data is written to the log-structured object store 200 in a sequential manner. As shown, in the illustrated example, each data object 204 includes a header, key, value, and tail marker. As these objects are committed to the log-structured object store 200, they are recorded in the in-memory index 202 so that they may be located and retrieved later without having to search the entire log-structured object store 200.

Checkpoints may also be written to the log-structured object store 200 in a sequential manner. When checkpoint operations are initiated to the log-structured object store 200, a begin checkpoint marker 206 may be written to the log-structured object store 200 to indicate that checkpoints 208 are to follow. Checkpoints 208 may then be written to the log-structured object store 200 for each key in the in-memory index 202. In certain embodiments, these checkpoints 208 may be interleaved or executed with any data objects 204 that are written to the log-structured object store 200. For example, if while writing checkpoints 208 to the storage media, a write operation is received to write an object 204 to the log-structured object store 200 (in the illustrated example "Key 5" and "Value 5"), the object may be written to the storage media, after which checkpoints 208 may continue to be written. An end checkpoint marker 210 may be written to the storage media when checkpoint operations have completed.

As shown in FIG. 2, an in-memory index 202 may be used to keep track of keys (and associated objects) stored in the log-structured object store 200, as well as their locations (i.e., log addresses). As updated versions of objects are written to the log-structured object store 200, the in-memory index 202 may be updated to point to the updated versions. For example, as can be observed in FIG. 1, "Key 1" and "Value 1" are initially written to location L1 of the log-structured object store 200. This object is then updated and written to location L11 as "Key 1" and "Value 2." Upon writing the new value to location L11, the in-memory index 202 is ideally updated to indicate that the value for "Key 1" is located at L11, as shown in FIG. 2.

As previously discussed, in the event of a shutdown or failure, the checkpoints 208 previously discussed may be used to more efficiently recover an in-memory index 202 that has been lost. In general, the in-memory index 202 may be recovered by scanning the log-structured object store 200 and recording the location of each key and associated object contained therein. Absent the checkpoints 208 previously discussed, this may be accomplished by scanning the log-structured object store 200 from its beginning and recording the location of each key in the in-memory index 202. However, using the checkpoints 208 previously discussed, the in-memory index 202 may be recovered in a more efficient manner by scanning the log-structured object store 200 starting from the "begin checkpoint" marker 206. Either technique will ideally allow the in-memory index 202 to be reconstructed, as shown in FIG. 2.

Figure 3:
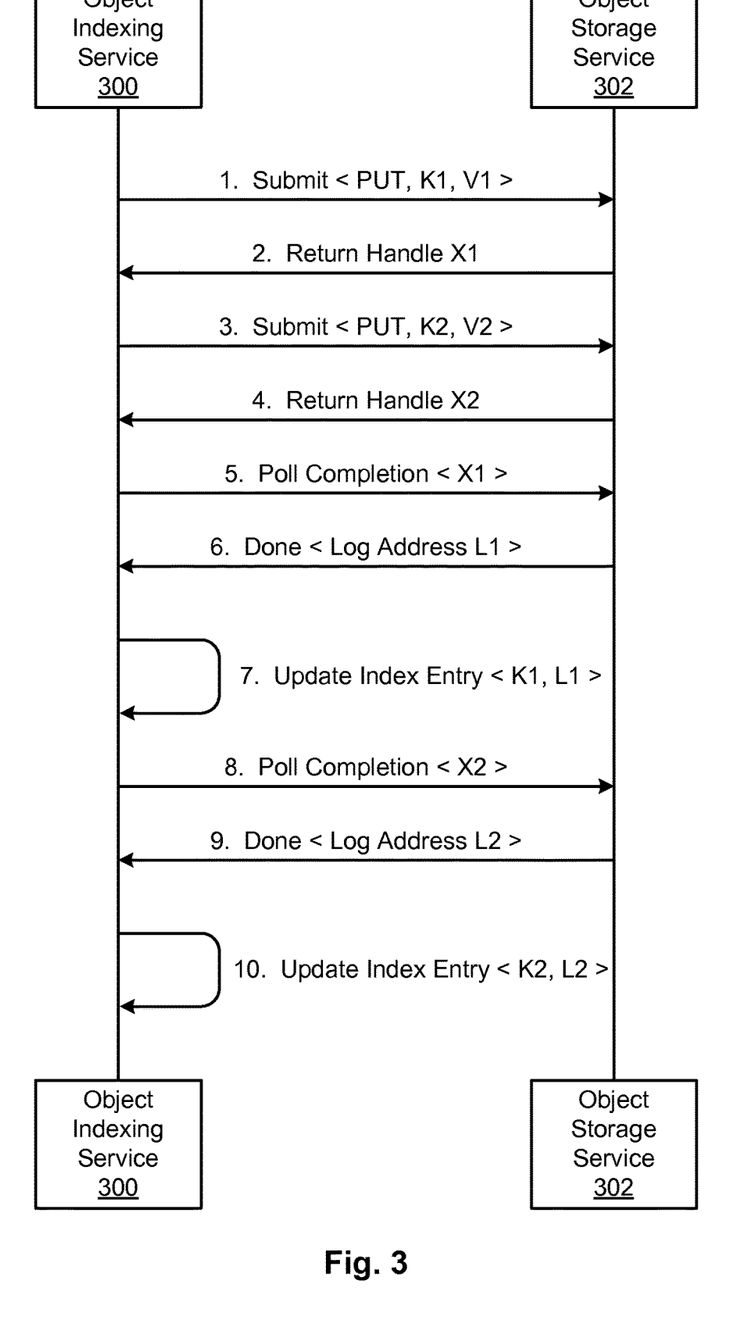
FIGS. 3 through 5 are sequence diagrams showing asynchronous operation that may produce a stale checkpoint.
Figure 4:
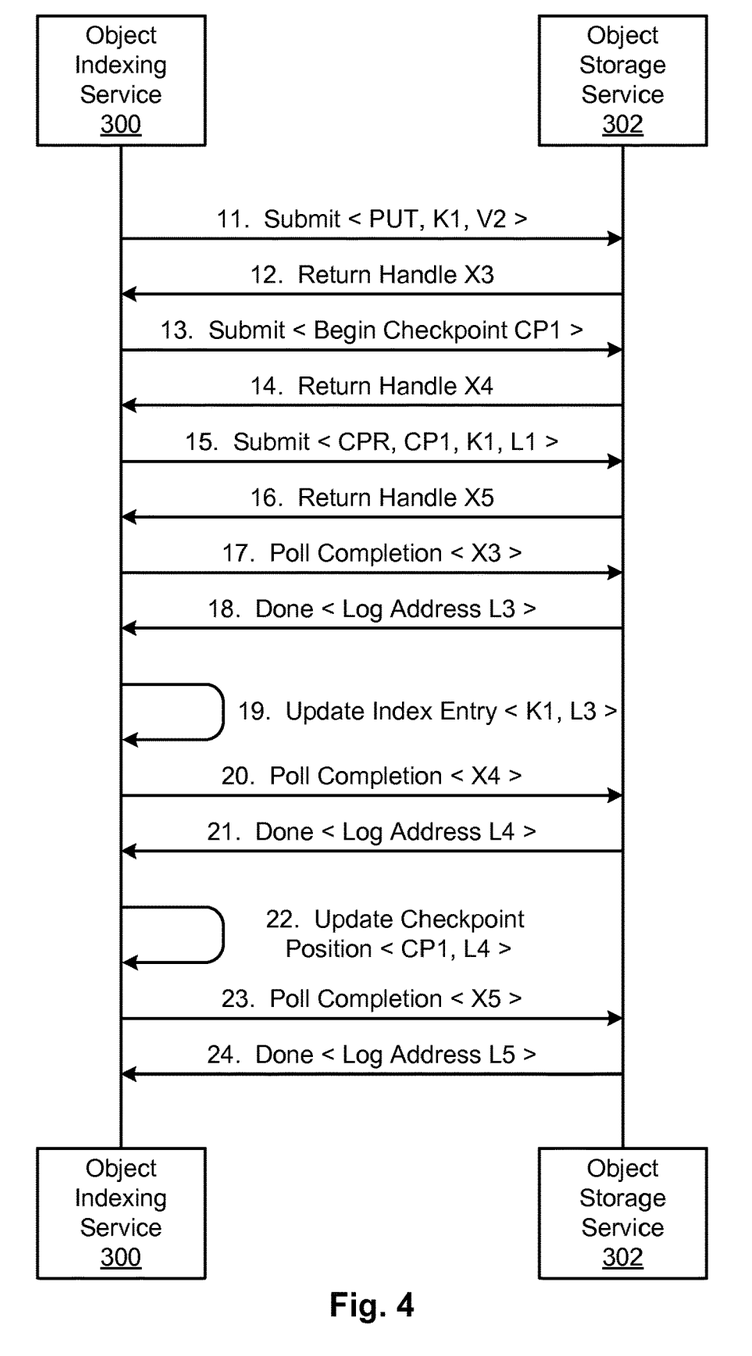
Figure 5:
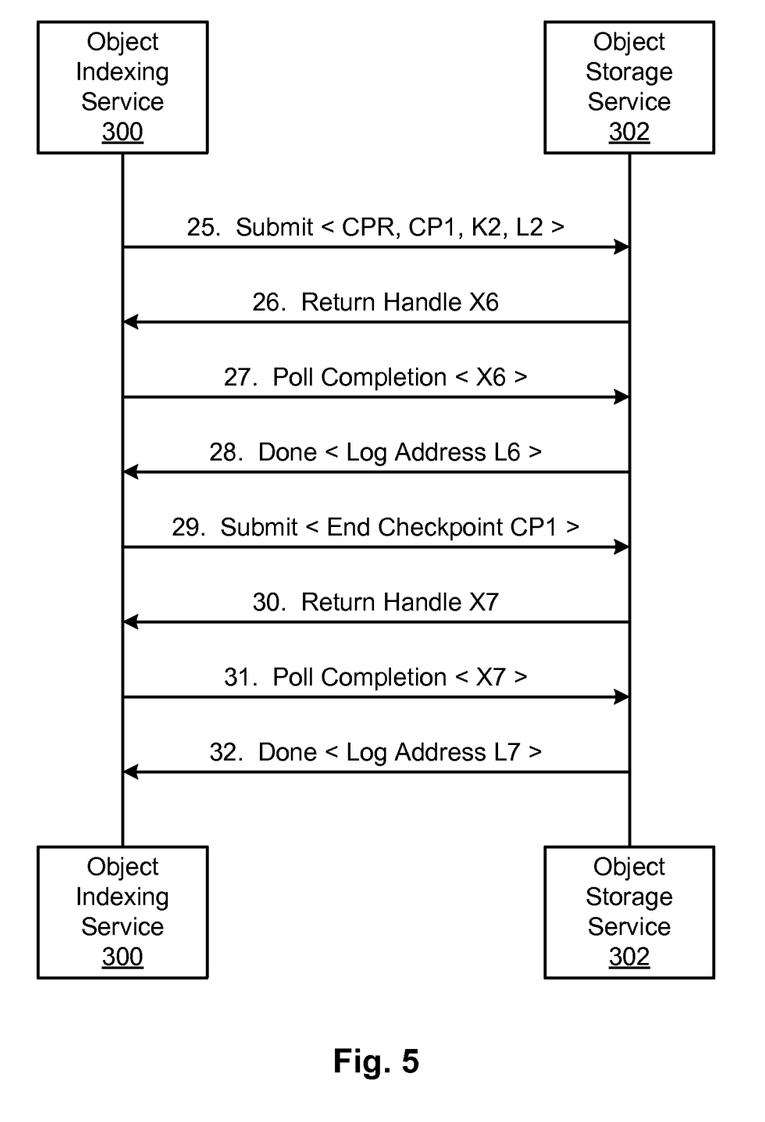

Referring to FIGS. 3 through 5, unfortunately, in log-structured object stores 200 that support asynchronous write operations, scenarios may occur where a "begin checkpoint" occurs after a write has occurred to the underlying storage media, but before the write has been recorded in the in-memory index 202. When such scenarios occur, an in-memory index 202 may be reconstructed in a way that misses the write operation, thereby allowing the write operation to "fall through the cracks" and not be reflected in the in-memory index 202. Such a scenario may be referred to as a "stale checkpoint."

FIGS. 3 through 5 are sequence diagrams that show a sequence of operations creating a stale checkpoint. As shown in FIGS. 3 through 5, an object indexing service 300 is configured to interact with an object storage service 302. The object storage service 302 may be responsible for persisting an object on storage media (disk, tape, etc.), whereas the object indexing service 300 may be responsible for updating the in-memory index 202 to reflect the stored object. Each service 300, 302 may, in certain embodiments, reside on a different machine. In the illustrated example, at step 1, the object indexing service 300 initially submits a write request (a "PUT" operation) to the object storage service 302 to store key K1 with value V1. At step 2, the object storage service 302 executes this request and returns a token X1 to the object indexing service 300 so that the object indexing service 300 can later check whether the PUT operation completed (in accordance with asynchronous operation).

In the illustrated example, at step 3, the object indexing service 300 submits a second write request (a "PUT" operation) to the object storage service 302 to store key K2 with value V2. At step 4, the object storage service 302 executes this request and returns a token X2 to the object indexing service 300 so that the object indexing service 300 can later check whether the PUT operation completed successfully.

At step 5, the object indexing service 300 polls the completion of X1 to determine if the write operation associated with X1 completed successfully. At step 6, the object storage service 302 responds to the object indexing service 300 by indicating that the write completed successfully to log address L1 in the log-structured object store 200. At step 7, the object indexing service 300 updates the in-memory index 202 (creates an entry in the in-memory index 202) to indicate that key K1 is stored at log address L1. At steps 8 and 9, a similar process occurs where the object indexing service 300 polls the completion of X2 and the object storage service 302 responds to the object indexing service 300 by indicating that the write at step 3 completed successfully to log address L2. At step 10, the object indexing service 300 updates the in-memory index 202 to indicate that key K2 is stored at log address L2.

Referring to FIG. 4, at steps 11 through 13, a scenario occurs that results in the "stale checkpoint" problem previously discussed. At step 11, the object indexing service 300 submits a third PUT operation to the object storage service 302 for key K1 with value V2. In essence, this step updates the object associated with K1 (previously created at step 1) with a new value V2. At step 12, the object storage service 302 executes the request and returns a token X3 to the object indexing service 300 so that the object indexing service 300 can later check whether the PUT operation completed. At step 13, before the object indexing service 300 is able to verify that the PUT operation at step 11 completed and update the in-memory index 202 accordingly, the object indexing service 300 instructs the object storage service 302 to write a "begin checkpoint" marker to the log-structured object store 200 so that checkpoint operations may be initiated. At step 14, the object storage service 302 returns token X4 to the object indexing service 300 so that the object indexing service 300 can later check whether the "begin checkpoint" marker was successfully written.

At step 15, the object indexing service 300 instructs the object storage service 302 to write a checkpoint record to remember that key K1 is stored at location L1. At step 16, the object storage service 302 returns token X4. At step 17, the object indexing service 300 polls the completion of X3 to determine if the write operation associated with X3 completed successfully. At step 18, the object storage service 302 responds to the object indexing service 300 that the write completed successfully to log address L3 in the log-structured object store 200. At step 19, the object indexing service 300 updates the in-memory index 202 to indicate that key K1 is stored at log address L3.

As shown in FIG. 4, although key K1 is stored at location L3 (as indicated in steps 17 through 19), the checkpoint operation performed at step 15 indicates that key K1 is stored at location L1. If the in-memory index 202 were reconstructed using the checkpoint created at step 15, it would erroneously indicate that key K1 is stored at location L1 instead of location L3. Thus, the checkpoint created at step 15 is what is referred to as a "stale checkpoint." The systems and methods disclosed herein and in the appended claims are intended to avoid the stale checkpoint problem identified in FIG. 4. Specifically, the systems and methods disclosed herein ensure that a reconstructed in-memory index 202 accurately reflects the state and location of data in a log-structured object store 200.

Steps 20 through 32 as set forth in FIGS. 4 and 5 are self-explanatory based on the foregoing description and thus do not require further explanation. Furthermore, a description of these steps is unnecessary to understand the stale checkpoint problem described above, as well as the disclosed solution thereto.

Figure 6:
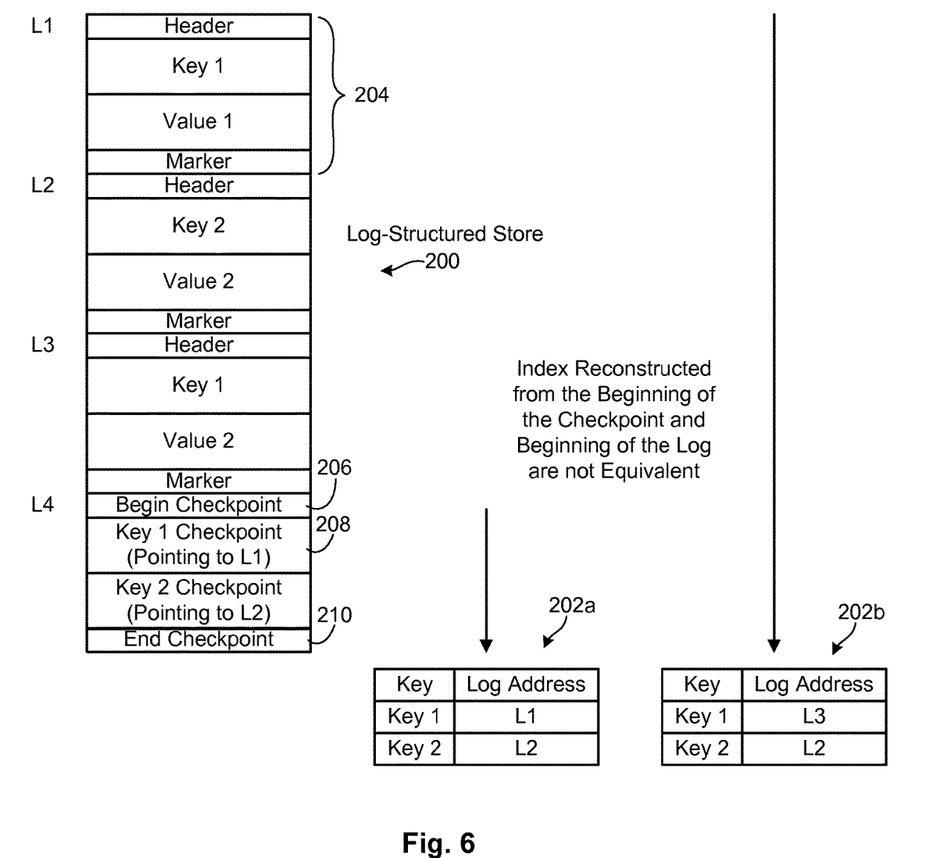
FIG. 6 is a high-level block diagram showing conventional recovery of a in-memory index where a stale checkpoint is present.

Referring to FIG. 6, an example showing the effects of a stale checkpoint is provided. In this example, a "begin checkpoint" marker is written to the log-structured object store 200 at location L4. It is also assumed that at the time the "begin checkpoint" marker was written, the in-memory index 202 was not updated to indicate that Key 1 and Value 2 was stored at location L3 of the log-structured object store 200 (a result of asynchronous operation). In such a scenario, two different outcomes may result when reconstructing the in-memory index 202. For example, if the in-memory index 202 is reconstructed starting from the "begin checkpoint" marker 206, the result will be in-memory index 202a that shows Key 1 to be resident at location L1. This is incorrect since Key 1 was updated with new location L3. By contrast, if the in-memory index 202 is reconstructed starting from the beginning of the log-structured object store 200, the result will be in-memory index 202b that shows Key 1 to be resident at location L3. This is correct since the in-memory index 202 reflects the updated location of Key 1.

Figure 7:
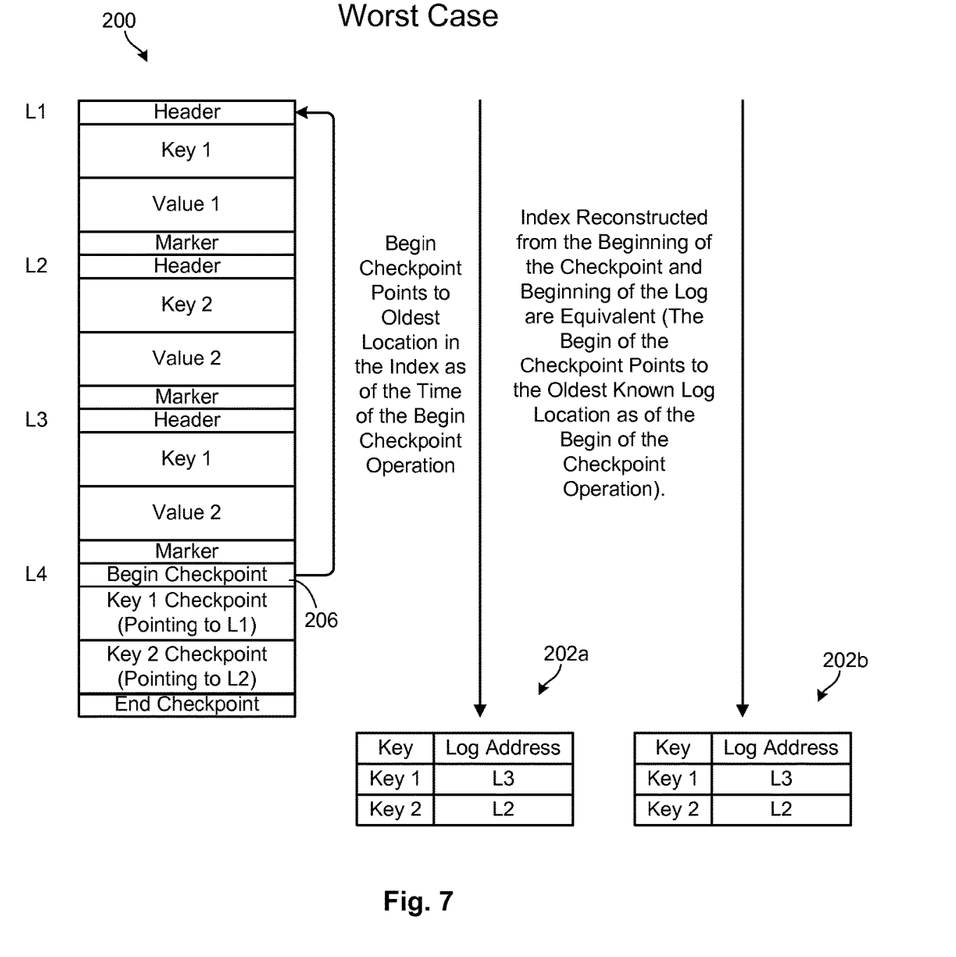
FIG. 7 is a high-level block diagram showing a method for recovering an in-memory index that avoids problems associated with a stale checkpoint, showing a worst case scenario in terms of performance.

Referring to FIG. 7, in order to prevent the inconsistencies caused by the stale checkpoint discussed above, systems and methods in accordance with the invention may be configured to change the point in the log-structured object store 200 from which the in-memory index 202 is reconstructed. For example, instead of examining the log-structured object store 200 from the "begin checkpoint" marker 206 previously discussed, the reconstruction process may start from an oldest known log location recorded in the in-memory index 202. To accomplish this, in certain embodiments, the "begin checkpoint" marker may be configured to point to an oldest known log location in the log-structured object store 200. The oldest known log location is one example of a location in the log-structured object store 200 that is known to be committed and reflected in the in-memory index 202. Starting the reconstruction process from this point in the log-structured object store 200 will ensure that the reconstructed in-memory index 202 will reflect all objects (including "in flight" objects) written to the log-structured object store 200, without having to analyze the entire store 200. Finding the oldest known log location may be accomplished by searching the in-memory index 202 for the earliest entry at the time checkpoint operations are performed on the log-structured object store 200.

Figure 8:
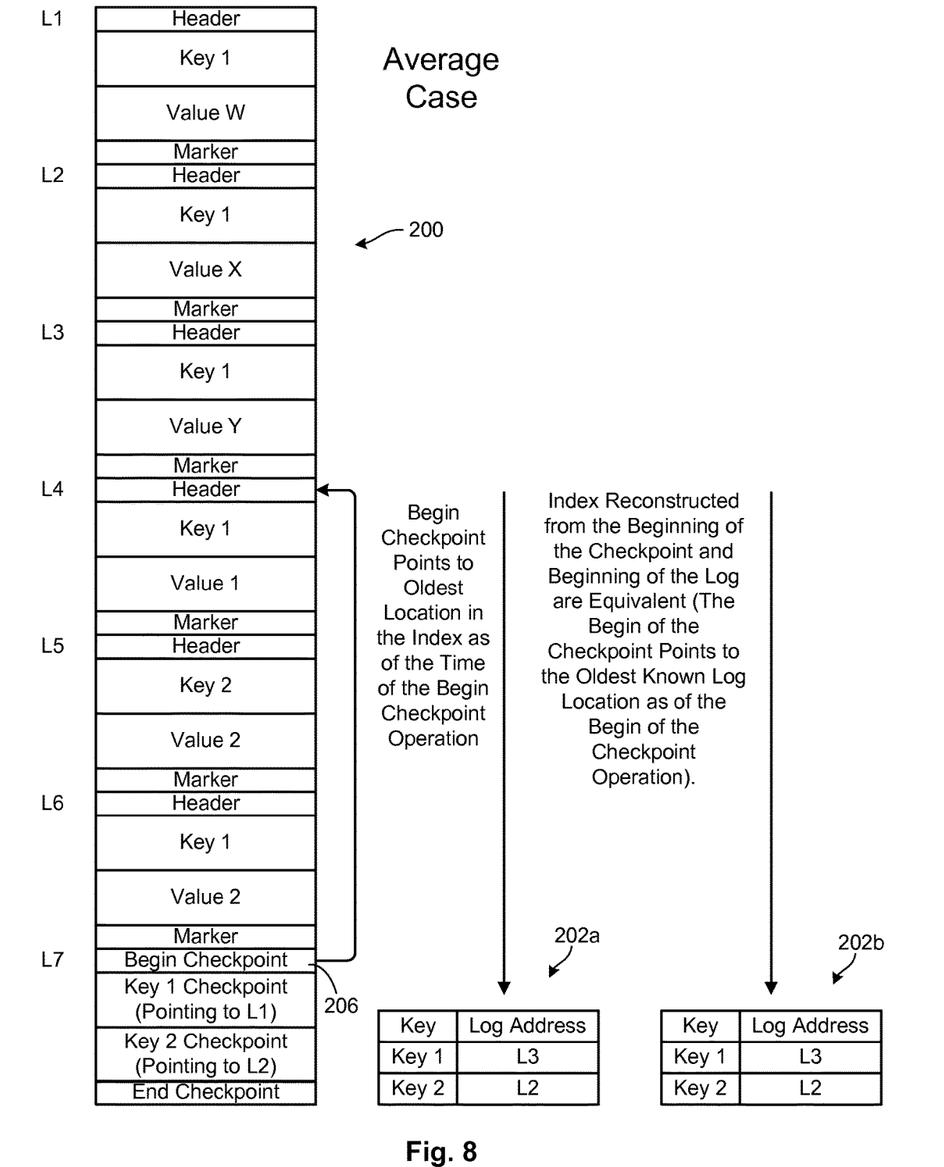
FIG. 8 is a high-level block diagram showing a method for recovering an in-memory index that avoids problems associated with a stale checkpoint, showing an average case in terms of performance.

Using this methodology, the index reconstruction process will generate the same in-memory index 202 that would be generated by starting the analysis from the beginning of the log-structured object store 200. This methodology, however, provides greater efficiency than starting the analysis from the beginning of the log-structured object store 200. FIG. 7 shows a worst case scenario where the oldest known log location is the beginning of the log-structured object store 200. In this scenario, the disclosed methodology would not yield an efficiency gain. FIG. 8, by contrast, shows an average case where the oldest known log location is a location near the middle of the log-structured object store 200. The inventors of the disclosed methodology have found that, on average, no more than half of the log-structured object store 200 needs to be analyzed when reconstructing the in-memory index 202. This represents a significant increase in efficiency.

Figure 9:
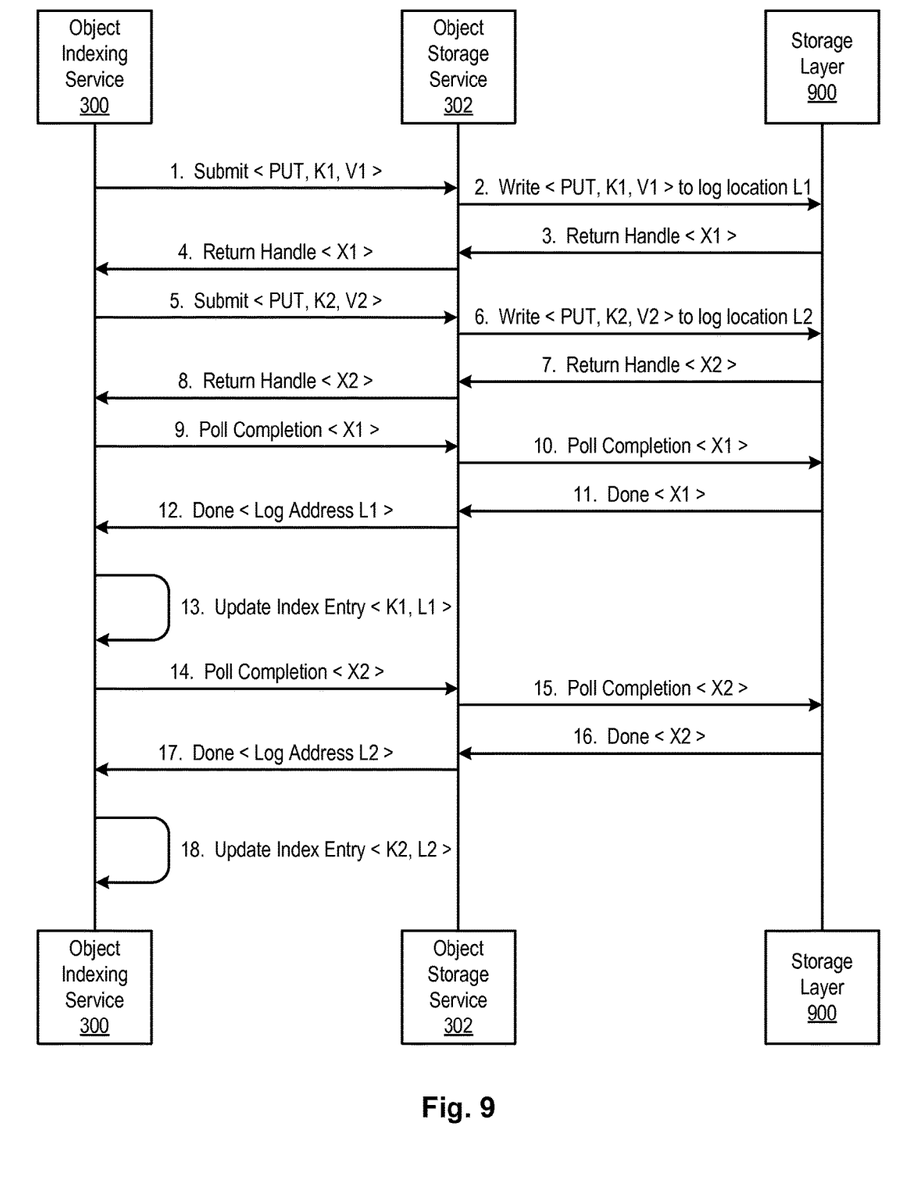
FIGS. 9 through 11 are sequence diagrams that show an alternative embodiment of a method for recovering an in-memory index in a way that avoid problems associated with a stale checkpoint.
Figure 10:
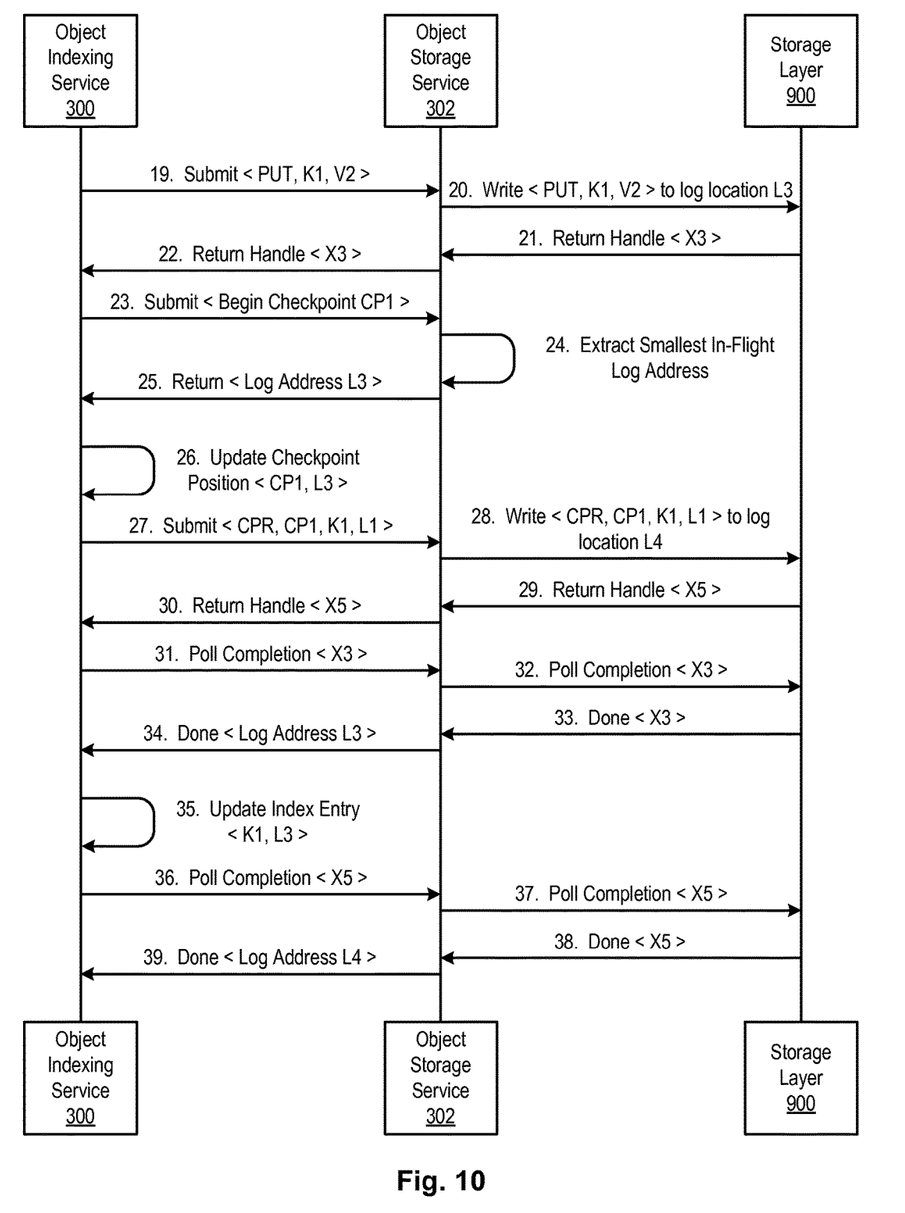
Figure 11:
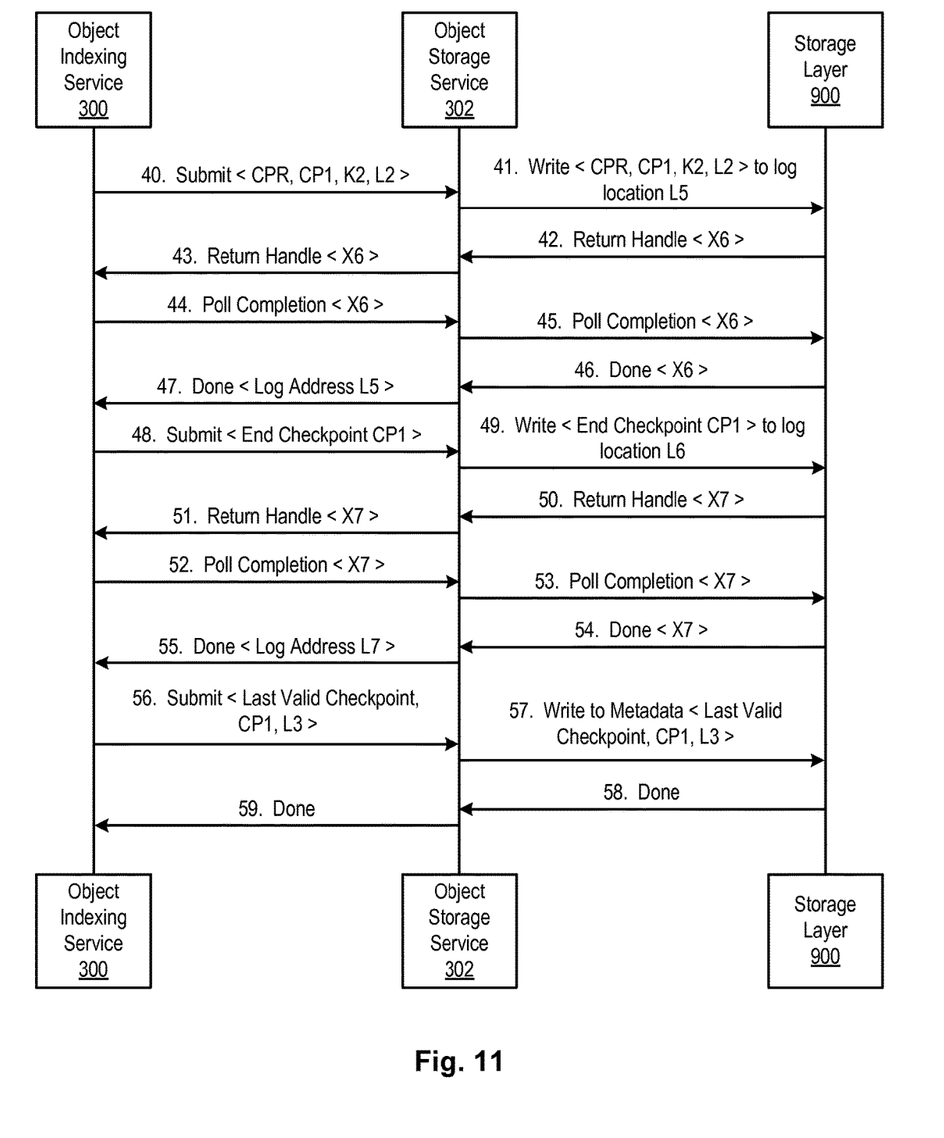

Referring to FIGS. 9 through 11, sequence diagrams showing an alternative embodiment of a method for recovering an in-memory index 202 is illustrated. The sequence diagrams are similar to those illustrated in FIGS. 3 through 5 except that an additional module 900 (i.e., storage layer 900) is shown to facilitate an understanding of the alternative methodology.

As shown in FIG. 9, at step 1, the object indexing service 300 submits a PUT operation to the object storage service 302 to store key K1 with value V1. At step 2, the object storage service 302 instructs the storage layer 900 to write key K1 with value V1 to log location L1. At step 3, the storage layer 900 returns a token X1 to the object storage service 302 and, at step 4, the object storage service 302 returns the token to the object indexing service 300. Later, at steps 9 and 10, the object indexing service 300 and object storage service 302 poll the completion of token X1. At step 11, the storage layer 900 indicates that the write completed successfully. At step 12, the object storage service 302 indicates that the write is complete and returns log address L1 where the write completed. At step 13, the object indexing service 300 updates the in-memory index 202 with an entry indicating that key K1 was stored at location L1.

Steps 19 through 39 of FIG. 10 roughly correspond to steps 11 through 24 of FIG. 4 except that an alternative methodology is presented for reconstructing an in-memory index 202. As shown, in step 19, the object indexing service 300 submits a PUT operation to the object storage service 302 for key K1 with value V2. At step 20, the object storage service 302 writes key K1 with value V2 to log location L3. This step updates the object associated with K1 with a new value V2. At steps 21 and 22, the storage layer 900 and object storage service 302 return a token X3 to the object indexing service 300 so that the object indexing service 300 can later check whether the PUT operation completed. At step 23, before the object indexing service 300 is able to verify that the PUT operation at step 19 completed and update the in-memory index 202 accordingly, the object indexing service 300 instructs the object storage service 302 to write a "begin checkpoint" marker to the log-structured object store 200 so that checkpoint operations may be initiated. At this point, the new methodology described above is executed.

As shown, at step 24, once the request to begin the checkpoint is received at step 23, the object storage service 302 extracts the earliest in-flight log address that has been written to but not reported to the object indexing service 300. To accomplish this, the object storage service 302 may determine all outstanding operations that are in flight at the point in time the "begin checkpoint" request is received. These operations may include those that are queued up, not yet written to the storage media, and/or written to the storage media but not yet reported to the object indexing service 300 (and therefore not recorded in the in-memory index 202). The object storage service 302 may then determine the earliest log address associated with these outstanding operations. At step 25, the object storage service 302 returns this address to the object indexing service 300. At step 26, the checkpoint position is modified to reflect the earliest log address associated with the outstanding operations. If an in-memory index 202 is reconstructed starting from this address in the log-structured object store 200, the in-memory index 202 will reflect all objects written to the storage media.

Steps 27 through 59 as set forth in FIGS. 10 and 11 are self-explanatory based on the foregoing description and thus do not require further explanation. Furthermore, a description of these steps is unnecessary to understand the stale checkpoint problem described above, as well as the disclosed solution thereto.

Figure 12:
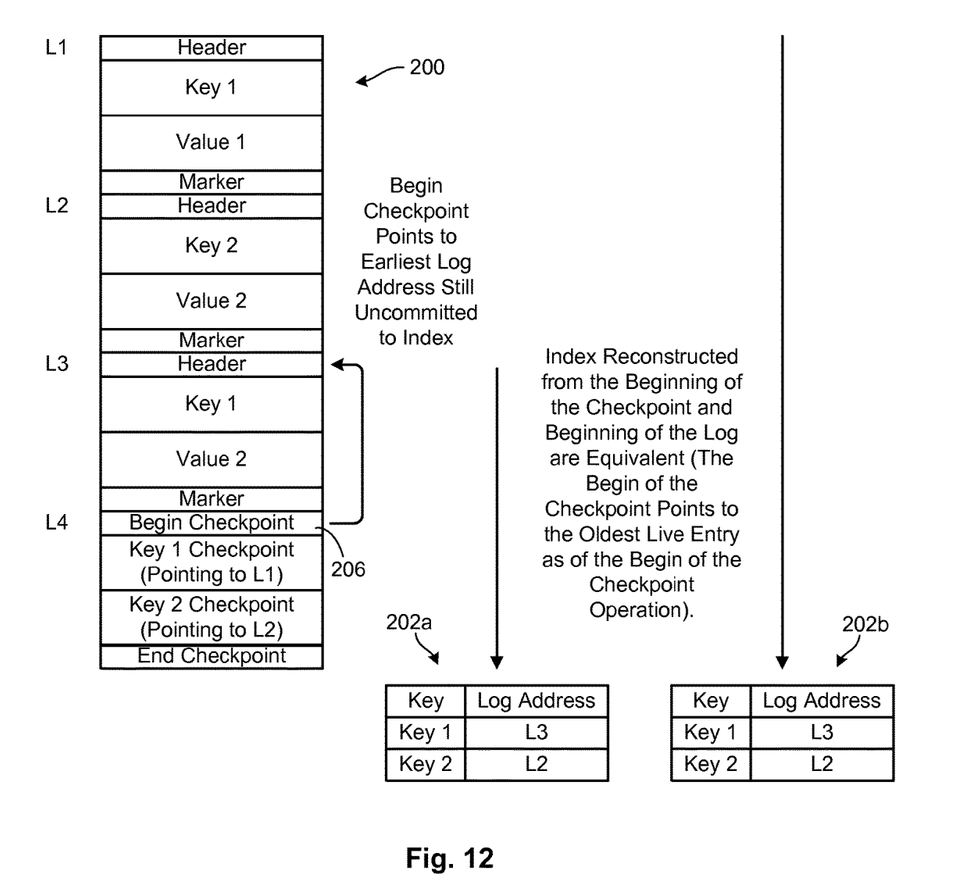
FIG. 12 is a high-level block diagram that shows recovery of an in-memory index using the alternative method described in association with FIGS. 9 through 11.

Referring to FIG. 12, the alternative methodology described in association with FIGS. 9 through 11 is illustrated. As shown, a "begin checkpoint" marker 206 is configured to point to an earliest in-flight log address that has been written to the log-structured object store 200, but not reported to the object indexing service 300. This guarantees that a reconstructed in-memory index 202 will reflect all objects written to the storage media, including those objects that were in flight (e.g., written to the storage media but not recorded in the in-memory index 202) when a checkpoint operation was initiated. As shown in FIG. 12, whether starting from the earliest in-flight log address or the beginning of the log-structured object store 200, the reconstruction process will result in the same in-memory index 202a, 202b. However, starting from the earliest in-flight log address will provide significant gains in efficiency.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for efficiently reconstructing an in-memory index associated with a log-structured object store, the method comprising:
   enabling asynchronous write operations to occur to a log-structured object store, the log-structured object store utilizing an in-memory index to record locations of objects written to the log-structured object store;
   as objects are updated and written to an end of the log-structured object store, updating the locations in the in-memory index;
   enabling checkpoint operations to occur to the log-structured object store without pausing the asynchronous write operations;

when initiating checkpoint operations, establishing a "begin checkpoint" marker on the log-structured object store; and configuring the "begin checkpoint" marker to point to an oldest known log location recorded in the in-memory index.

2. The method of claim 1, wherein the oldest known log location is the beginning of the log-structured object store.

3. The method of claim 1, wherein the oldest known log location is a location between the beginning of the log-structured object store and the "begin checkpoint" marker.

4. The method of claim 1, further comprising, in the event the in-memory index is lost, reconstructing the in-memory index by analyzing the log-structured object store starting from the oldest known log location.

5. The method of claim 1, wherein the checkpoint operations and asynchronous write operations are performed in an interleaved manner.

6. The method of claim 1, wherein the in-memory index contains a key and log address for each object in the log-structured object store.

7. The method of claim 1, wherein each object stored in the log-structured object store is identified using a key stored therewith.

8. A computer program product to efficiently reconstruct an in-memory index associated with a log-structured object store, the computer program product comprising a non-transitory computer-readable storage medium having computer-usable program code embodied therein, the computer-usable program code comprising:

computer-usable program code to enable asynchronous write operations to occur to a log-structured object store, the log-structured object store utilizing an in-memory index to record locations of objects written to the log-structured object store;

computer-usable program code to, as objects are updated and written to an end of the log-structured object store, update the locations in the in-memory index;

computer-usable program code to enable checkpoint operations to occur to the log-structured object store without pausing the asynchronous write operations;

computer-usable program code to, when initiating checkpoint operations, establish a "begin checkpoint" marker on the log-structured object store; and computer-usable program code to configure the "begin checkpoint" marker to point to an oldest known log location recorded in the in-memory index.

9. The computer program product of claim 8, wherein the oldest known log location is the beginning of the log-structured object store.

10. The computer program product of claim 8, wherein the oldest known log location is a location between the beginning of the log-structured object store and the "begin checkpoint" marker.

11. The computer program product of claim 8, further comprising computer-usable program code to, in the event the in-memory index is lost, reconstruct the in-memory index by analyzing the log-structured object store starting from the oldest known log location.

12. The computer program product of claim 8, wherein the checkpoint operations and asynchronous write operations are performed in an interleaved manner.

13. The computer program product of claim 8, wherein the in-memory index contains a key and log address for each object in the log-structured object store.

14. The computer program product of claim 8, wherein each object stored in the log-structured object store is identified using a key stored therewith.

15. A system to efficiently reconstruct an in-memory index associated with a log-structured object store, the system comprising:

at least one processor;

at least one memory device operably coupled to the at least one processor and storing instructions for execution on the at least one processor, the instructions causing the at least one processor to:

enable asynchronous write operations to occur to a log-structured object store, the log-structured object store utilizing an in-memory index to record locations of objects written to the log-structured object store;

update the locations in the in-memory index as objects are updated and written to an end of the log-structured object store;

enable checkpoint operations to occur to the log-structured object store without pausing the asynchronous write operations;

when initiating checkpoint operations, establish a "begin checkpoint" marker on the log-structured object store; and configure the "begin checkpoint" marker to point to an oldest known log location recorded in the in-memory index.

16. The system of claim 15, wherein the oldest known log location is the beginning of the log-structured object store.

17. The system of claim 15, wherein the oldest known log location is a location between the beginning of the log-structured object store and the "begin checkpoint" marker.

18. The system of claim 15, wherein the instructions further cause the at least one processor to, in the event the in-memory index is lost, reconstruct the in-memory index by analyzing the log-structured object store starting from the oldest known log location.

19. The system of claim 15, wherein the checkpoint operations and asynchronous write operations are performed in an interleaved manner.

20. The system of claim 15, wherein the in-memory index contains a key and log address for each object in the log-structured object store.

* * * * *